Figure 1:
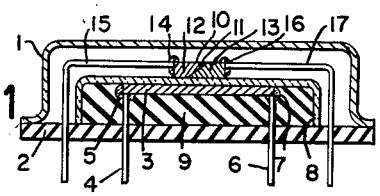

United States Patent Office 3,217,169
Patented Nov. 9, 1965

3,217,169
ELECTRO-OPTICAL SEMICONDUCTOR DEVICE WITH SUPERLINEAR RECOMBINATION RADIATION SOURCE
Hermann Georg Grimmeiss, Aachen, Germany, and Hein Koelmans, Eindhoven, Netherlands, assignors to North American Philips Company, Inc., New York, N.Y., a corporation of Delaware
Filed Jan. 30, 1962, Ser. No. 169,868
Claims priority, application Netherlands, Feb. 7, 1961, 260,956
10 Claims. (Cl. 250—217)

This invention relates to electro-optical semi-conductor devices comprising at least one source of radiation and at least one photo-conductive body coupled thereto by electrical and/or optical means.

In known electro-optical devices of this kind, the radiation source comprises an electro-luminescent body of the ZnS-type in which the radiation is produced by field excitation of electrons in a strong field of alternating voltage. The photo-conductive body employed therein is usually a photo-electric resistance of cadmium sulphide or cadmium selenide.

As is well known, such an electro-optical device may be used, for example, as a radiation modulator or a radiation intensifier in that the electro-luminescent body and the photo-conductive body are electrically coupled together, for example electrically connected in series. A radiation signal incident on the photo-conductive body causes a decrease in the resistance of the photoconductor, so that the voltage across the electro-luminescent body increases and an intensified light signal may be obtained. As is well-known, such a device may also be used as an electrical modulator or intensifier by coupling the photo-conductive body to the electro-luminescent body by optical means, that is to say by relatively arranging the two bodies so that the radiation produced by the electro-luminescent body acts upon the photo-conductive body. An electrical input signal is converted by the electro-luminescent body into radiation which, upon striking the photo-conductive body, induces therein a variation in resistance which may be derived as an electrical output signal. As is well-known, such electro-optical devices may operate as electrically bistable or optically bistable switching elements by using in the electrical modulator, in addition to the optical coupling, an electrical feedback coupling or using in the radiation intensifier, in addition to the electrical coupling, an optical feedback coupling.

However, the electro-luminescent bodies of the ZnS-type employed in known electro-optical devices have a limitation in that they can be operated only with alternating voltage while the electrical field strength to be produced in the electro-luminescent body must be high. Also, the radiation density of the said electro-luminescent bodies is comparatively small so that only comparatively low powers can be modulated with a given radiating surface. For many switching applications it is also desirable for the intensity of radiation to increase in a strong superlinear relationship with the electrical magnitude, for example voltage or current, to be applied, at least in a given range of the applied voltage or current, that is to say, that in this range the value $n$ in the relation for radiation intensity $S = C(U)^n$, wherein U represents the electrical magnitude, for example the current or voltage to be applied, C represents a constant and $n$ is a measure of the superlinearity and therefore referred to hereinafter as the superlinearity exponent, must as much as possible be greater than unity. In known electro-luminescent bodies of the ZnS-type, $n$ has a fairly low value with usable radiation densities, namely a value of at most approximately 4.

An object of the invention is inter alia to provide a simple electro-optical device which is very suitable for the aforementioned uses and which may be operated with direct voltage and a low field strength, such a device permits of obtaining an exceptionally high superlinearity exponent $n$ and because of the high radiation density for a comparatively small radiating surface, it also permits the resistance of the photo-conductive body, upon a comparatively small variation in the electrical magnitude applied to the radiation source, to be varied, if necessary, over a large range of resistance, for example from $10^9$ to $10^3$ ohms, so that comparatively great powers may be modulated with comparatively small radiating surfaces.

According to the invention, in an electro-optical semi-conductor device comprising at least one radiation source and at least one photo-conductive body coupled thereto electrically and/or by optical means, at least one radiation source is a p-n-type recombination radiation source having a radiation intensity which increases in super-linear relationship with the current strength through the radiation source, at least over a part of the current range, due to incorporation of radiationless recombination centers.

The term "p-n-type recombination radiation source" is to be understood herein in the ususal manner to mean a semi-conductor body having at least one junction between a p-type conductive zone and an n-type conductive zone, wherein by applying a potential difference to this junction, usually in the forward direction, the charge carrier, electrons and/or holes, originating by injection from one zone recombine on their way to the other zone, or after arrival in the other zone, with locally available charge carriers of opposite type, either through band-band transitions or through existing radiation centers, the energy released upon recombination being converted to a substantial proportion into radiation of the desired wave-length or wave-lengths. Although such recombination may also take place via band-band transitions directly, it is in many cases desirable to incorporate radiation or radiative centers in the vicinity of the p-n-type junction.

The term "radiationless or non-radiative recombination center," frequently also referred to in the literature as a "killer" center, is to be understood herein in the usual manner to mean a center having a comparatively large capture cross-section through which the recombination takes place radiationless, that is to say at least without generation of radiation wave-length effective for the electro-optical device, usually with conversion into thermal energy of the crystal lattice.

Radiationless recombination centers which have been found suitable are inter alia those having a capture cross-section for the charge carriers injected for recombination which is larger than, for example 100 times larger than, the capture cross-section for the available charge carriers of the opposite type after an injected charge carrier has been captured at the center. As is well-known, such radiationless recombination centers are formed in semi-conductive materials by crystal defects or certain impurities, usually transition elements such, for example, as iron or cobalt.

In a p-n-type recombination radiation source for use in an electric-optical semi-conductor device according to the invention, the superlinear dependency of radiation intensity upon the current strength through the radiation source occurs in a range of current intensities corresponding to a number of injected charge carriers at which the radiationless recombination centers become saturated. After the recombination at a lower current strength has substantially taken place only via the radiationless recombination levels because of the large product of the capture probability and concentration of the radiationless energy levels, a saturation range of these levels is reached upon further increase of the current strength and a corresponding proportional increase in the number of injected charge carriers, in which saturation range, according as saturation increases, a constantly growing proportion of the injected charge carriers starts recombining via the radiative transitions, for example radiation centers, so that the radiation intensity increases very rapidly and this in superlinear relationship to current strength. Saturation once having been obtained, the radiation intensity increases to a considerably lesser extent, for example again substantially in proportion to current strength. The mechanism of the injection and recombination of charge carriers in such a p-n-type recombination radiation source makes it possible, as has also been found empirically, to obtain in a simple manner a high superlinearity exponent $n$, for example of 20, in a given current range.

Because of the large capture cross section of radiationless recombination centers, it is possible, by choosing a sufficient concentration of these centers, to ensure that recombination first takes place via the centers without radiation and, at a higher current intensity, via radiating transitions. This may be achieved in a simple manner in a p-n-type recombination source having incorporated radiative centers and incorporated non-radiative recombination centers by providing that the product of the incorporated concentration of non-radiative recombination centers and of the capture cross-section of these centers is much greater than the corresponding product for the radiative centers.

When using a band-band transition as a radiating transition, it is possible, likewise by choice of a great product of the radiationless centers, to ensure that the probability of radiating band-band recombination upon slight injection is small relative to the radiationless recombination.

The concentration of the radiationless recombination centers may be chosen between wide limits, more particularly between $10^{12}$ and $10^{20}$ per cub. cm. It may be, for example, $10^{16}$ per cub. cm. In a specific case the concentration to be used is dependent inter alia upon the kind of the center, more particularly the capture cross-section thereof, upon the probability of the radiative transition employed, and upon the desired location of the current level in which the superlinear region occurs, since saturation is reached only at a higher current density if the concentration of radiationless recombination centers is high.

The semi-conductive materials for the p-n-type recombination radiation source and the photo-conductive body and their activation are chosen, as is usually the case in an electro-optical device, so that at least one photo-conductive body in the device is photo-sensitive to the radiation wave-length or wave-lengths produced by at least one radiation source present in the device. To this end, a p-n-type radiation source emitting, for example, infra-red radiation or visible radiation may be combined with a photo-conductor which is sensitive to infrared or the relevant wave-length of the visible radiation. Very favourable results were obtained with a p-n-type radiation source having a semi-conductor body of gallium phosphide in combination with a photo-sensitive body of CdS or CdSe.

Figure 2:
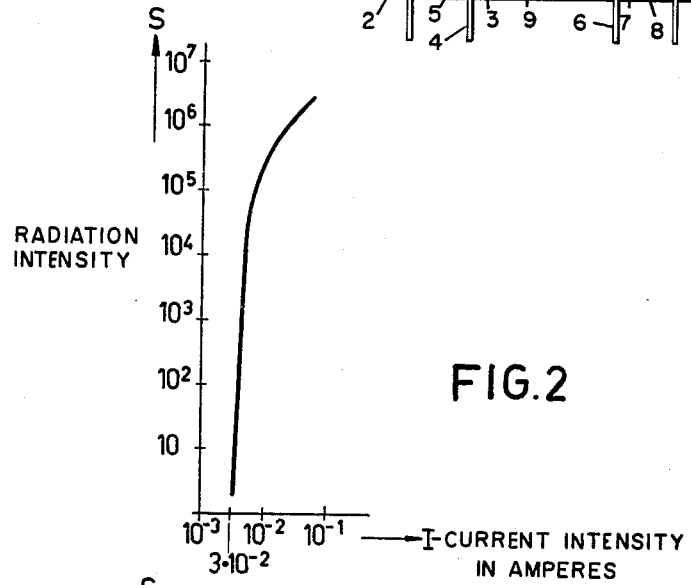
Figure 3:
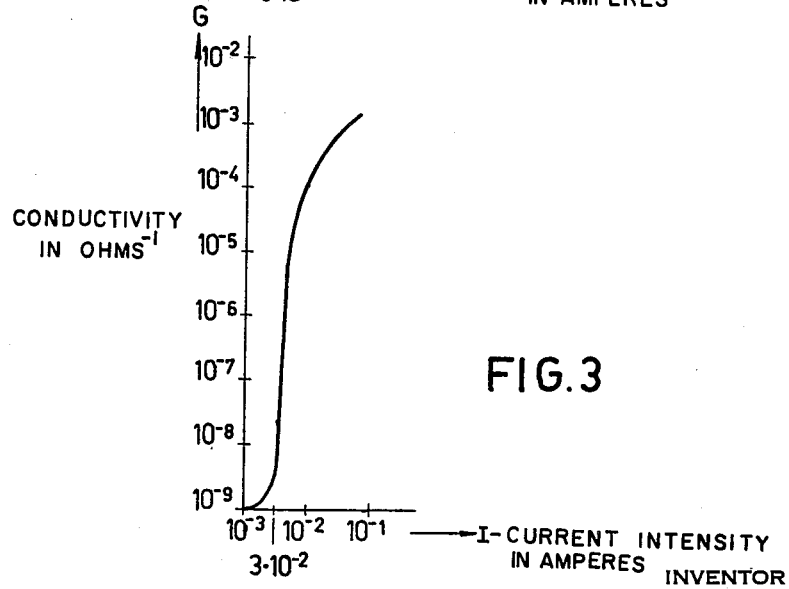

In order that the invention may be readily carried into effect, it will now be described in detail, by way of example, with reference to the accompanying diagrammatic drawing, in which:

FIGURE 1 is a sectional view of one embodiment of an electro-optical device according to the invention;

FIGURE 2 shows a graph illustrating the relationship between the radiation intensity and the current strength of the p-n-type recombination radiation source used in the electro-optical device of FIGURE 1, and FIGURE 3 shows a graph illustrating the relationship between the conductivity G of the photo-conductive body and the current through the radiation source, as measured in an electro-optical device of FIGURE 1.

In the electro-optical semi-conductor device according to the invention shown in FIGURE 1, the p-n-type recombination radiation source and the photo-conductive body are housed in the envelope formed by an aluminum vessel 1, polished on its inner side, and a supporting plate 2 of bakelite. The photo-conductive body 3 is in the form of a moulded and sintered CdS disc activated with about $10^{-4}$ atoms of Cu per molecule of CdS and a substantially equal concentration of gallium. The upper side of the disc 3 is provided, as is common practice for photo-electric-resistances, with two comb-shaped thin electrode layers of gold applied by evaporation-deposition and interleaved with each other, one electrode layer being connected in an electrically conductive manner to the copper supply conductor 4 through a silver paste layer 5 and the other electrode layer being connected to a copper supply conductor 6 through a silver paste layer 7. The electrode layers themselves are not shown for the sake of clarity.

The photo-conductive body 3 engages the upper wall of a glass vessel 8 which is otherwise filled with a resin, for example "Araldite." The supply conductors 4 and 6 of the photo-electric resistance are led through the resin 9 and the supporting plate 2 to the exterior.

The glass vessel 8 carries the p-n-type recombination radiation source comprising a gallium-phosphide crystal in the form of a substantially circular disc 10 of about 3 mms. in diameter and about 0.2 mm. thick. A p-n-junction 11 between a p-type conductive zone 12 and an n-type conductive zone 13 extends across the disc 10. A copper supply conductor 15 is connected through an amount of indium-gallium alloy (50% of In; 50% of Ga) 14 to the p-type conductive zone 12 and a supply conductor 17 is connected through an amount of indium-gallium alloy (50% of In; 50% of Ga) 16 to the n-type conductive zone 14. The two supply conductors are led through the supporting plate 2 to the exterior.

The gallium-phosphide crystal 10 contains, in addition to an acceptor concentration producing the p-type conductivity in the p-type zone 12, which acceptor concentration may be, for example, gallium vacancies (excess of phosphorus), and in addition to the donor concentration producing the n-type conductivity in the n-type zone 13, which donor concentration may be, for example, phosphorus vacancies (excess of gallium), a concentration of radiationless recombination centers, originating for example from iron, to an amount of about $10^{16}$ per cm.$^3$ of GaP, and a concentration of radiation centers, for example zinc, to an amount of about $2 \times 10^{16}$ per cm.$^3$ of GaP. The product of the cencentration and capture cross-section of the radiationless centers, may in this way be about $10^4$ times larger as the corresponding product of the radiation centers. Such a gallium-phosphide crystal may be obtained in that the constituents gallium to an amount of 10 grams, containing about 10 parts per million iron and phosphorus to an amount of 3 grams, contained in a two-limbed closed quartz tube are heated in a double oven for obtaining a solution of phosphorus in gallium. To this end the limb containing the gallium was heated to about 1220° C. and the limb containing the phosphorus was heated to about 430° C. Upon slow cooling of the resulting gallium-phosphorus solution, which contains an excess of gallium, gallium-phosphide crystals in a gallium phase crystallize from the solution. The limb containing the phosphorus was subsequently removed and a second limb containing 200 mgs. of zinc was sealed, after exhaustion, to the other limb containing the reaction product. The latter limb was then heated to about 1220° C. for about half an hour and the limb containing the zinc was heated to 500° C. During this process a certain proportion of the zinc dissolves in the reaction product which has now melted again. After cooling, the reaction product was heated to about 100° C. in a platinum crucible containing a dilute solution of hydrochloric acid, in order to isolate the segregated gallium-phosphide crystals from a gallium phase. A crystal having a p-n-type junction extending across it was now selected from the resulting crystals which, upon spectro-chemical analysis, were found to contain about $10^{16}$ atoms of iron and about $2\times10^{16}$ atoms of zinc per cm.$^3$ of gallium phosphide.

After providing contacts consisting of an alloy of 50% of indium and 50% of gallium, one on each side of the p-n-type junction, a direct voltage was applied between the contacts with the positive pole connected to the p-type zone. An orange-red radiation was then emitted in the vicinity of the p-n-type junction at a sufficiently high current strength, for example of 10 ma. Subsequently, the intensity of radiation was measured at room temperature as a function of the current strength supplied to the contacts.

FIGURE 2 shows a graph of this relationship in which the current strength I in amps is plotted horizontally on a logarithmic scale and the radiation intensity S is plotted vertically in arbitraray units on a logarithmic scale. The radiating surface was about 1 sq. mm. The radiation intensity was found to have a measurable magnitude only when a threshold current strength of about 4 ma. was achieved. The radiation intensity increases in a strongly superlinear relationship with a superlinearity exponent $n$ of about 20 in a range from 4 ma. to about 6 ma. and further increases substantially in linear relationship with current strength upon further increase in current strength. In the range from 0 to 4 ma. the recombination takes place substantially only via radiationless recombination centers; in the superlinear range from the threshold value 4 ma. to about 6 ma. the radiationless recombination centers are saturated so that the share of the radiating recombination via the introduced zinc centers rapidly increases. Zinc produces an acceptor level at about 0.4 electronvolt above the valence band. This level is charged with electrons in the region at room temperature. The radiating recombination via these energy levels may be explained by the holes injected into the region recombining with electrons from the zinc level. To this end electrons are supplied from the conductive band while delivering an amount of energy of about 1.8 electron volts, which corresponds to the wavelength of about 7000 A. found experimentally for maximum emission.

The value of the threshold current strength at which the superlinear branch of the characteristic curve occurs coincides substantially with the saturation of the radiationless recombination centers. Such saturation occurs at a current strength $$I_s = \frac{a \times C}{\tau}$$

wherein $a$ represents a proportionality constant, C represents the concentration of radiationless recombination centers and $\tau$ represents the recombination period of these centers. In the identified case of a radiationless recombination center having a capture cross-section for the injected charge carriers which is larger than for charge carriers of the opposite type, the recombination period is $$\tau = \frac{1}{kn}$$

wherein $k$ represents the capture probability of the center for a charge carrier of the opposite type after capturing an injected charge carrier, and $n$ represents the concentration of existing charge carriers of opposite type available to be supplied to the recombination center. Consequently, the range of current intensities in which the superlinear behaviour occurs may be displaced to a lower current strength or a higher current strength by decreasing or increasing the concentration C or the number of free charge carriers $n$.

The radiation intensity varies substantially in linear relationship with current strength after saturation is attained, that is to say, above about 10 ma., as may be seen from FIGURE 2.

The gallium-phosphide crystal was subsequently arranged in the electro-optical device of FIGURE 1 having optical coupling between the photo-sensitive body 3 and the radiation source 10 via the glass portion 8. The electric conductivity G in ohm$^{-1}$ between the supply conductors 4 and 6 was measured as a function of the current strength supplied to the radiation source 10 through the supply conductors 15 and 17.

FIGURE 3 shows a graph of this relationship, in which the current strength I through the radiation source is plotted horizontally in amps on a logarithmic scale and the conductivity G in ohm$^{-1}$ is plotted vertically likewise on a logarithmic scale. The figure shows that the conductivity G in the region from 3 to 6.5 ma. already increases from the very low value of about $2\times10^{-9}$ ohm$^{-1}$ to about $10^{-4}$ ohm$^{-1}$, whereas G has only increased to $10^{-3}$ ohm$^{-1}$ for a value of about 20 ma.

Such a strong characteristic curve of an electro-optical device having optical coupling between the photo-sensitive body and the radiation source may advantageously be used inter alia as a sensitive electric switch controllable by small variations in current, or as an electrical amplifier having a high differential amplification.

In addition to its application as an electrical modulator or amplifier, an electro-optical device according to the invention may also advantageously be used as a radiation modulator by employing instead of an optical coupling, an electrical coupling e.g. an electric series-connection between the photo-conductive body and the p-n-type radiation source. It is then possible to bring about a comparatively great variation in the radiant energy of the p-n-type radiation source by supplying a comparatively small radiation signal to the photo-conductor.

Bistable electrical or optical switching elements of reliable operation which are adapted to be switched by small variations in current or small variations in radiant energy may be obtained by providing also an electrical feedback coupling or an optical feedback coupling in the electro-optical device according to the invention designed as an electrical amplifier or a radiation intensifier.

In conclusion, it is to be noted that the invention is naturally not limited to the embodiment described, but many further modifications are possible for a skilled person within the scope of the invention. Thus, it is possible to use other arrangements conventional for electro-optical devices and, for example, to combine a plurality of such radiation sources with one or more photo-conductive bodies. The p-n-junction in the p-n-type radiation source may in known manner be in the form of an abrupt junction or of a gradual junction via a high-ohmic or intrinsic intermediate layer. Other semi-conductive materials such, for example, as germanium, aluminum phosphide or silicon carbide may be used in the radiation source with photo-conductors sensitive to the relevant radiation.

What is claimed is:

1. In an electro-optical semiconductor device comprising a p-n type recombination radiation source associated with and optically coupled to a photoconductor device wherein said radiation source comprises a semiconductive body having p-type and n-type regions forming at least one junction and means connected to the p-type and n-type regions for passing current of a given range of intensity through the body in a direction causing the injection of charge carriers from one region across the junction into an adjacent region causing the generation of radiation in a given spectral range and at a certain level as a function of the current passing through the body as expressed in the relation $S = f(I)^n$, where S is the output radiation intensity, I is the current intensity and $n$ is the superlinearity exponent, and wherein the photoconductor device has a spectral response characteristic enabling it to respond to and have its conductivity significantly modified by the radiation impinging thereon from the radiation source, the improvement comprising means providing within the said adjacent region of the semiconductive body of the radiation source a concentration of non-radiative recombination centers having a capture cross-section and a concentration of radiative recombination centers having a capture cross-section wherein the product of the concentration and capture cross-section of the non-radiative centers is at least 100 times greater than the corresponding product for the radiative centers, the superlinearity exponent $n$ having a value of at least 4 resulting from the fact that, below a threshold value within the said given range of current intensity, the non-radiative centers dominate the capture of the injected carriers causing little radiation generation whereas, above the said threshold value of current intensity, the radiative centers dominate the capture of the injected carriers causing a sudden, very large increase in the intensity of radiation generation S.

2. The electro-optical semiconductor device set forth in claim 1 wherein the non-radiative recombination centers are present in a concentration of at least $10^{16}$ per cubic centimeter of semiconductive material.

3. In an electro-optical semiconductor device comprising a p-n type recombination radiation source associated with and optically coupled to a photoconductor device wherein said radiation source comprises a semiconductive body having p-type and n-type regions forming at least one junction and means connected to the p-type and n-type regions for passing current of a given range of intensity through the body in a direction causing the injection of charge carriers from one region across the junction into an adjacent region causing the generation of radiation in a given spectral range and at a certain level as a function of the current passing through the body as expressed in the relation $S = f(I)^n$, where S is the output radiation intensity, I is the current intensity and $n$ is the superlinearity exponent, and wherein the photoconductor device has a spectral response characteristic enabling it to respond to and have its conductivity significantly modified by the radiation impinging thereon from the radaton source, the improvement comprising means providing within the said adjacent regon of the semiconductive body of the radiation source a concentration of at least $10^{16}$ per cubic centimeter of non-radiative recombination centers having a large capture cross-section and a concentration of at least $10^{16}$ per cubic centimeter of radiative recombination centers having a small capture cross-section whereby the product of the concentration and capture cross-section of the non-radiative centers is at least 100 times greater than the corresponding product for the radiative centers, the superlinearity exponent $n$ having a value of at least 4 resulting from the fact that, below a threshold value within the said given range of current intensity, the non-radiative centers dominate the capture of the injected carriers causing little radiation generation whereas, above the said threshold value of current intensity, the radiative centers dominate the capture of the injected carriers causing a sudden, very large increase in the intensity of radation generation S.

4. The electro-optical semiconductor device set forth in claim 3 wherein the said adjacent region contains a concentration of at least $10^{16}$ per cubic centimeter of a transition element selected from the group consisting of iron and cobalt and serving as the non-radiative recombination centers.

5. The electro-optical semiconductor device set forth in claim 4 wherein the radiation source comprises zinc-activated gallium phosphide, and the photoconductor device comprises a compound selected from the group consisting of cadmium sulphide and cadmium selenide.

6. In an electro-optical semiconductor device comprising a p-n type recombination radiation source associated with and electrically coupled to a photoconductor device wherein said radiation source comprises a semiconductive body having p-type and n-type regions forming at least one junction together with, when the resistance of the photoconductor device is reduced by external radiation, means connected to the photoconductor device and the p-type and n-type regions for passing current of a given range of intensity through the body in a direction causing the injection of charge carriers from one region across the junction into an adjacent region causing the generation of radiation in a given spectral range and at a certain level as a function of the current passing through the body as expressed in the relation $S = f(I)^n$, where S is the output radiation intensity, I is the current intensity and $n$ is the superlinearity exponent, and wherein the photoconductor device has a spectral response characteristic enabling it to respond to and have its conductivity sufficiently reduced by the external radiation impinging thereon to the level enabling the current through the body to exceed a threshold value, the improvement comprising means providing within the said adjacent region of the semiconductive body of the radiation source a concentration of non-radiative recombination centers having a capture cross-section and a concentration of radiative recombination centers having a capture cross-section whereby the product of the concentration and capture cross-section of the non-radiative centers is at least 100 times greater than the corresponding product for the radiative centers, the superlinearity exponent $n$ having a value of at least 4 resulting from the fact that, below the threshold value within the said given range of current intensity, the non-radiative centers dominate the capture of the injected carriers causing little radiation generation whereas, above the said threshold value of current intensity, the radiative centers dominate the capture of the injected carriers causing a sudden, very large increase in the intensity of radiation generation S.

7. The electro-optical semiconductor device set forth in claim 6 wherein the non-radiative recombination centers are present in a concentration of at least $10^{16}$ per cubic centimeter of semiconductive material.

8. In an electro-optical semiconductor device comprising a p-n type recombination radiation source associated with and electrically coupled to a photoconductor device wherein said radiation source comprises a semiconductive body having p-type and n-type regions forming at least one junction together with, when the resistance of the photoconductor device is reduced by external radiation, means connected to the photoconductor device and the p-type and n-type regions for passing current of a given range of intensity through the body in a direction causing the injection of charge carriers from one region across the junction into an adjacent region causing the generation of radiation in a given spectral range and at a certain level as a function of the current passing through the body as expressed in the relation $S = f(I)^n$, where S is the output radiation intensity, I is the current intensity and $n$ is the superlinearity exponent, and wherein the photoconductor device has a spectral response characteristic enabling it to respond to and have its conductivity sufficiently reduced by the external radiation impinging thereon to the level enabling the current through the body to exceed a threshold value, the improvement comprising means provided within the said adjacent region of the semiconductive body of the radiation source a concentration of at least $10^{16}$ per cubic centimeter of non-radiative recombination centers having a large capture cross-section and a concentration of at least $10^{16}$ per cubic centimeter of radiative recombination centers having a small capture cross-section whereby the product of the concentration and capture cross-section of the non-radiative centers is at least 100 times greater than the corresponding product for the radiative centers, the superlinearity exponent $n$ having a value of at least 4 resulting from the fact that, below the threshold value within the said given range of current intensity, the non-radiative centers dominate the capture of the injected carriers causing little radiation generation whereas, above the said threshold value of current intensity, the radiative centers dominate the capture of the injected carriers causing a sudden, very large increase in the intensity of radiation generation S.

9. The electro-optical semiconductor device set forth in claim 8 wherein the said adjacent region contains a concentration of at least $10^{16}$ per cubic centimeter of a transition element selected from the group consisting of iron and cobalt and serving as the non-radiative recombination centers.

10. The electro-optical semiconductor device set forth in claim 9 wherein the radiation source comprises zinc-activated gallium phosphide, and the photoconductor device comprises a compound selected from the group consisting of cadmium sulphide and cadmium selenide.

References Cited by the Examiner
UNITED STATES PATENTS

| | | | |
|---|---|---|---|
| 2,871,377 | 1/59 | Tyler et al. | 317—239 X |
| 2,871,427 | 1/59 | Tyler et al. | 317—239 |
| 3,043,958 | 7/62 | Diemer | 250—213 |
| 3,043,959 | 7/62 | Diemer | 250—213 |

OTHER REFERENCES

Halsted: "Luminescence Effects," The Role of Solid State Phenomena In Electric Circuits, Interscience Publishers (New York, 1957) (pages 275 to 287 relied on).

RALPH G. NILSON, *Primary Examiner.*

WALTER STOLWEIN, *Examiner.*